Feb. 13, 1962 W. L. BRISCOE 3,020,750
DIGITAL Q METER
Filed Sept. 16, 1960 2 Sheets-Sheet 1

INVENTOR.
William L. Briscoe
BY

United States Patent Office 3,020,750
Patented Feb. 13, 1962

3,020,750
DIGITAL Q METER
William L. Briscoe, Los Alamos, N. Mex., assignor to the United States of America as represented by the United States Atomic Energy Commission
Filed Sept. 16, 1960, Ser. No. 56,610
5 Claims. (Cl. 73—67.2)

This invention pertains to electronic devices for measuring the figure of merit of a resonant system and more particularly to digital reading electronic instruments for measuring the Q of any resonant system in which, for a particular mode of oscillation, it is possible to obtain an electrical output proportional to the amplitude of the oscillations.

In modern technology, particularly with respect to data processing, it is becoming more desirable to present information in digital rather than analog form to facilitate the use of computers in systems analysis work. In such work it is occasionally desirable to measure the Q of mechanically as well as electrically resonant devices. For example, if the rate of decay of a vibratory condition at resonant frequency of a metallographic sample is measured as a function of temperature, subsequent determination of the Q's of the sample enables calculation of the elastic properties of the metal which in turn are indicative of the internal friction over the range of temperature. There are only a few types of Q meters currently usable for determining the Q of a mechanical device, and none of these meters present data in digital form. While it is desirable to obtain readings which are independent of frequency, the measurements of currently used Q meters are frequency dependent thereby requiring the inclusion of circuitry to normalize the reading with respect to frequency.

It is therefore an object of the present invention to provide a Q meter usable to determine the figure of merit of both mechanically and electrically resonant devices.

It is also an object of the present invention to provide a Q meter which presents information in digital form.

It is a further object of the present invention to provide a Q meter which presents a reading independent of frequency.

Figure 1:
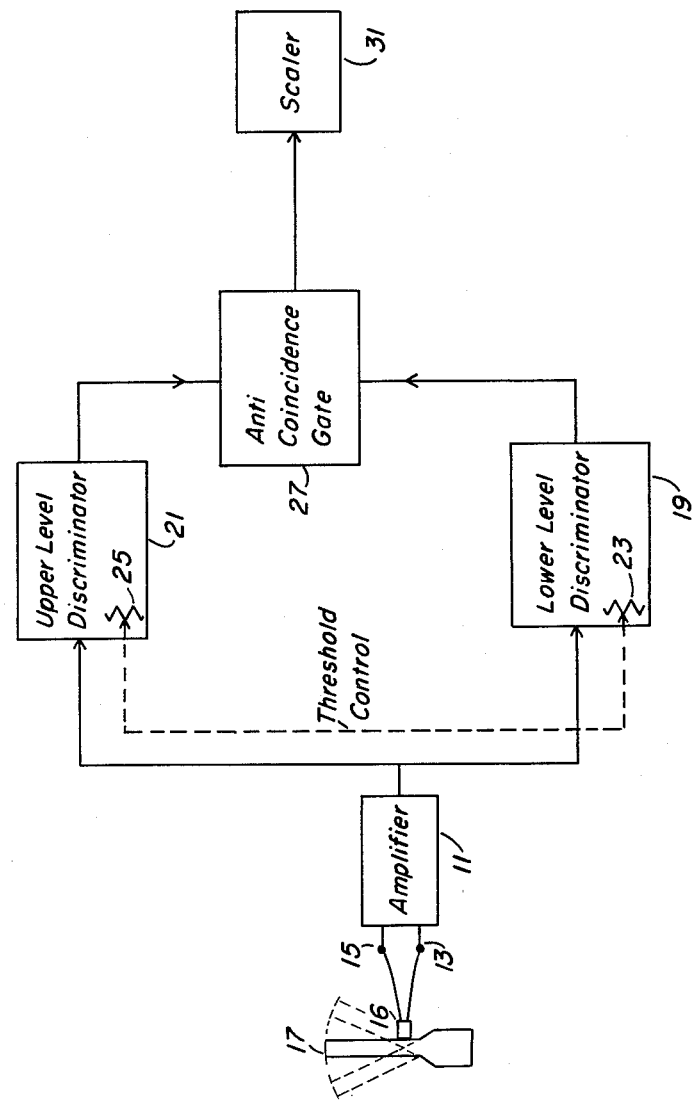
Figure 2:
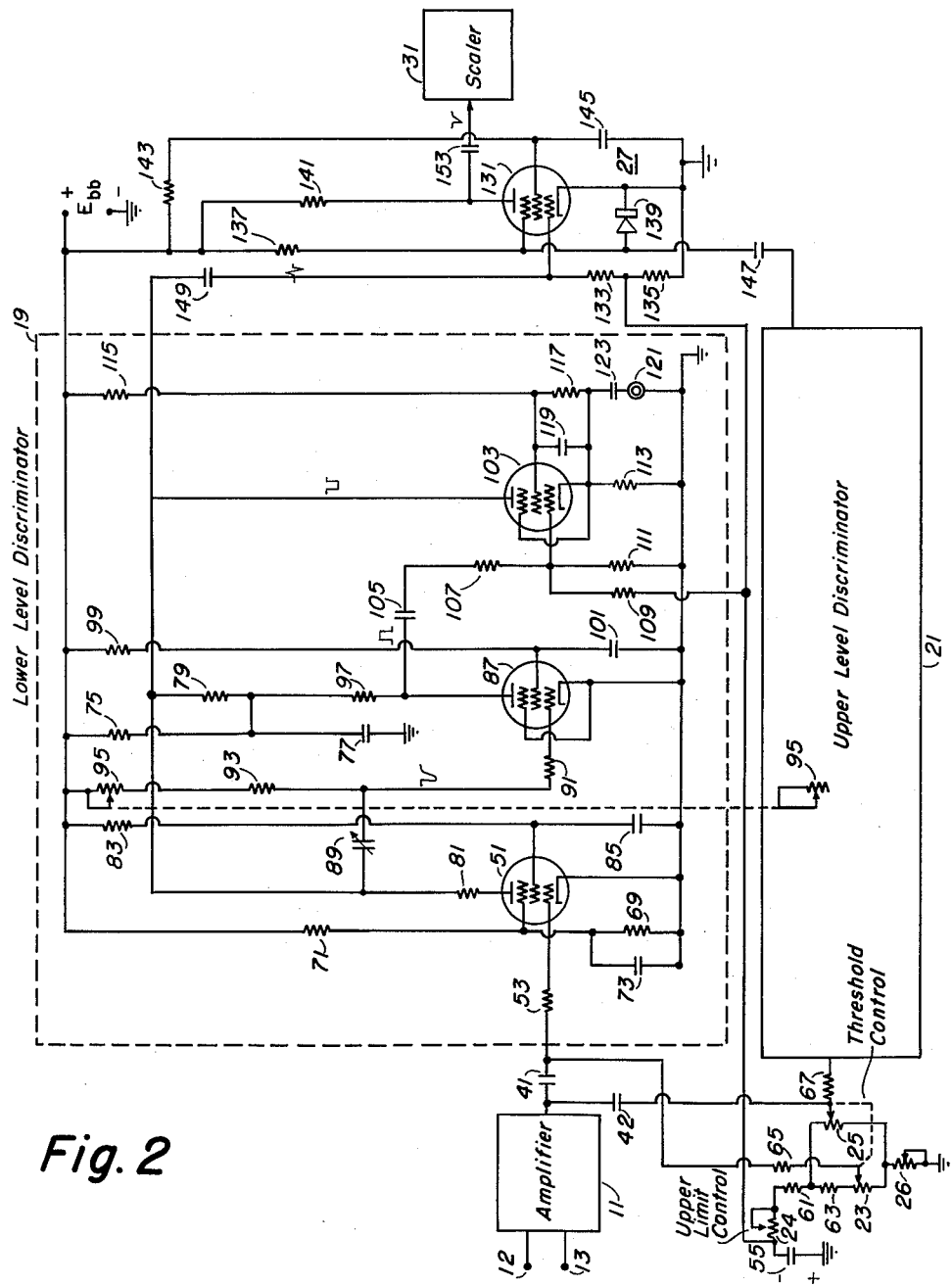

Other objects and a fuller understanding of the invention may be had by referring to the following description and claims, taken in conjunction with the accompanying drawing in which:

FIGURE 1 is a block diagram showing the various circuit functions of the device of the present invention; and, FIGURE 2 is a schematic diagram, partially in block form, of a preferred embodiment of the device of the present invention.

The objects of the present invention are achieved generally by forced excitation of the system to be measured, removal of the forced excitation and counting the number of voltage cycles between two amplitude levels of the decaying sinusoid. The number of cycles, $n$, is related to the circuit Q in the following manner:

$$n = \frac{\ln \frac{E_1}{E_2}}{\pi/Q}$$

and $$Q = \frac{n\pi}{\ln \frac{E_1}{E_2}}$$

where $\ln$ designates the natural logarithm, $E_1$ is the voltage at a first selected point on the decaying sinusoid, and $E_2$ is the voltage at a second and subsequent selected point on the decaying sinusoid. For greatest accuracy $E_1$ should be taken at a relatively high value so the measurement will be taken over the steeper beginning portion of the sinusoid envelope. If $E_2$ is selected to be 36.8% of $E_1$ (corresponding to the ratio $1/e$, where "$e$" is the base of natural logarithm) then the denominator of the preceding equation becomes unity and the number of intervening voltage cycles multiplied by $\pi$ will equal the Q of the device. These specifications of $E_1$ and $E_2$ are utilized in the preferred embodiment of the present invention.

The device, the Q of which is to be measured, is excited at its natural resonant frequency or it may be shock excited and the excitation then removed to permit the oscillatory state to decay at the natural resonant frequency. If the device is an electrically resonant one the decaying oscillation can be obtained by direct connection to the electrical circuit. If the sample is a mechanically resonant one, as for example, metallographic, a piezoelectric crystal or other transducer can be coupled to the device and excited at the natural resonant, or subharmonic frequency of the sample to build up the vibrational energy in the sample. Upon removal of the forced excitation, the decaying mechanical vibration is converted into a corresponding electric waveform.

Referring now to the block diagram of FIGURE 1 a preferred embodiment of the device of the present invention consists of an amplifier 11 having input terminals 13 and 15 connected to a transducer 16 which in turn is mechanically, acoustically, or magnetically coupled to sample 17, the Q of which is to be measured. The output signal voltage derived from the sample 17 is amplified by the amplifier 11 and fed to a lower level amplitude discriminator 19 and an upper level amplitude discriminator 21. The operating threshold level of the upper level discriminator 21 is adjusted to a selected value $E_1$ while the threshold level of the lower level discriminator is adjusted to the value of $E_2$ (36.8% of $E_1$). In practice, the threshold levels are adjustable by variable controls 23 and 25 which are ganged together to maintain the desired constant threshold level ratio of $1/e$. Outputs from the discriminators 19 and 21 are fed into an anti-coincidence gate 27 which is adjusted to produce an output only upon receipt of an input from the lower level discriminator 19 in the absence of an input from the upper level discriminator 21, i.e., the output from the lower level discriminator 19 provides the "count" signal while the output of the upper level discriminator 21 provides the "veto" signal. Output from the anti-coincidence gate 27 is fed to a fast scaler 31 which counts the number of pulses occurring while the voltage sinusoid decays between the preselected values $E_1$ and $E_2$, thereby affording a measurement of the Q of the resonant device.

The system is initially adjusted so that, under excitation, the amplified output from the resonant sample exceeds the threshold levels of both the discriminators 19 and 21. Under such conditions both of the discriminators 19 and 21 will be in operation and feed outputs to anti-coincidence gate 27. Since a veto signal is fed to the gate from the upper level discriminator 21 the gate is blocked and produces no output signal to scaler 31. When the excitation is removed from the resonant device the amplitude of the oscillations will begin to decay at a logarithmic rate. As the amplitude of oscillations drops below the threshold level of the upper level discriminator 21 that discriminator becomes inoperative, thereby removing the veto signal feed to gate 27, permitting the gate to open and allowing the pulses from the lower level discriminator 19 to pass through the gate and be counted by scaler 31. When the amplitude of the sinusoid decays below the threshold level of the lower level discriminator 19, the count into the scaler 31 stops. The count residing in the scaler is $Q/\pi$, hence the scaler reading is multiplied by $\pi$ to obtain the Q of the resonant system.

If it is desired to feed the digital scaler reading into a computer the threshold level controls of upper level discriminator 21 and lower level discriminator 19 can be ganged together to provide a ratio of 1/4.8 (instead of 1/e) so that the scaler reading multiplied by 2 will equal the Q of the resonant device; however, when the threshold levels $E_1$ and $E_2$ are that widely separated the value of $E_2$ will be along a much flatter portion of the logarithmic decay curve thereby requiring an extremely low noise level and very high discriminator sensitivity.

Referring now to FIGURE 2 for a detailed explanation of the preferred embodiment of the present invention, there is shown a schematic diagram of the discriminator and gating circuitry. Since the circuitry of both the upper and lower level discriminators is identical, only the circuitry for the lower level discriminator 19 is shown while the upper level discriminator 21 is depicted in block form. The circuitry of amplifier 11 is not shown since any standard form of circuitry will suffice. The requirements for amplifier 11 are that it be linear and have low impedance output.

The amplified signal voltage is passed through coupling capacitors 41 and 42 to the lower and upper level discriminators 19 and 21 respectively. (Although the signal will be traced only through the lower level discriminator it is to be understood that it is also applied to the upper level discriminator and passes through it in an identical manner, the only significant difference between the two discriminators being in the adjustment of the threshold levels.) The signal is impressed on the control grid of a first discriminator tube 51 through a parasitic suppression resistor 53. Grid bias is supplied from a D.C. bias voltage source 55, through a resistive bias voltage dividing network composed of adjustable resistors 24 and 26, potentiometer rheostats (potentiometers) 23, 25 and fixed resistors 61 and 63. The adjustable resistor 24 in conjunction with fixed resistor 61 sets the maximum permissible upper threshold limit. The adjustable resistor 26 sets a minimum threshold level, i.e., sets the zero reference level. The potentiometers 23 and 25 are ganged together and form an adjustable threshold control for both upper and lower level discriminators, the fixed resistor 63 serving to provide the desired threshold level ratio. The fixed resistors 65 and 67 have resistance values very much larger than that of adjustable resistor 26 and serve to provide a suitable minimum output impedance for the amplifier 11.

The first discriminator tube 51 is a pentode type of unique construction in which grid No. 3 is effectively a second control grid. A 6BN6 tube type is a typical example. This tube has the desirable property that neither the control grid nor grid No. 3 draw any appreciable amount of grid current even on positive signal voltage excursions. Resistors 69 and 71 form a voltage dividing network to provide positive operating bias voltage on grid No. 3 of tube 51. A bypass capacitor 73 is connected between grid No. 3 of tube 51 and ground to maintain the grid at A.C. ground potential. D.C. plate voltage for tube 51 is provided from a D.C. plate voltage source, not shown, connected to terminal designated $E_{bb}$, through an RC filter network consisting of a dropping resistor 75 and a capacitor 77, and through a common plate load resistor 79 and a parasitic suppression resistor 81. The D.C. screen grid voltage for tube 51 is obtained from terminals $E_{bb}$ through a current limiting resistor 83, a bypass capacitor 85 maintaining the screen grid at A.C. ground potential. The plate of tube 51 is capacitively coupled to the control grid of a second discriminator tube 87 through an adjustable coupling capacitor 89 and a parasitic suppression resistor 91. The control grid of tube 87 is returned to ground through the D.C. voltage terminals $E_{bb}$ and the D.C. voltage source via a fixed resistor 93 and an adjustable resistor 95. Since the cathode of tube 87 is grounded its control grid is clamped at approximately ground potential in the absence of a signal input and the tube will be normally conducting. Plate voltage for tube 87 is obtained from the voltage source $E_{bb}$ through the dropping resistor 75 and a plate load resistor 97. Screen grid voltage is obtained from the voltage terminals $E_{bb}$ through a current limiting resistor 99, the screen grid being maintained at A.C. ground potential by a bypass capacitor 101. Tube 87 is an ordinary pentode type and its suppressor grid is externally connected to the cathode.

The plate of tube 87 is capacitively coupled to the control grid of a "latch-down" tube 103 through a coupling capacitor 105 and a parasitic suppression resistor 107. A fixed negative bias voltage for the control grid of latch-down tube 103 is obtained from the bias voltage source 55 through a resistive voltage dividing network consisting of resistors 109 and 111. The fixed bias voltage is sufficient to negatively bias the control grid past cutoff, hence the tube 103 draws no plate current in the absence of an input signal voltage. A small amount of self-bias as well as degenerative feedback is provided by an unbypassed cathode resistor 113. D.C. plate voltage for tube 103 is obtained from the voltage terminals $E_{bb}$ through the dropping resistor 75 and the common plate load resistor 79. (Resistor 79 is the common plate load for both tubes 51 and 103.) The screen grid voltage for tube 103 is obtained from the terminals $E_{bb}$ through a resistive voltage dividing network consisting of resistors 115 and 117 and the cathode resistor 113, the screen grid being maintained at the same A.C. potential as the cathode by means of a bypass capacitor 119. A terminal jack 121 is connected between the cathode of tube 103 and ground through a coupling capacitor 123 to provide a connection for monitoring the discriminator performance.

The above-described circuitry, including tubes 51, 87 and 103, will be recognized as a modified version of the so-called "Harwell discriminator," in which version the delay line used in the Harwell circuit has been replaced by an adjustable RC network consisting of resistors 93 and 95 and capacitor 89. The Harwell circuit is useful to provide output pulses of constant length with sine wave inputs of different frequencies. In the device of the present invention it is the trailing edge of the lower level discriminator output pulse which eventually causes actuation of the counting circuit, hence it is desired that this trialing edge will always occur during the pulse period of the upper level discriminator. In other words, an upper level discriminator output pulse will always begin before and terminate after the trailing edge of the lowel level discriminator output pulse to provide effective vetoing of all output pulses from the lower level discriminator when the input sine wave peak height is in excess of the upper level discriminator threshold limit.

When a sine wave signal voltage is fed to the control grid of the first discriminator tube 51, the tube will begin conducting when the positive signal voltage exceeds the threshold level determined by the setting of adjustable resistor 23. Although very little grid current will flow in tube 51 due to its unique construction, the tube is easily driven to plate current saturation. Hence the plate potential will generally vary in a negative step function as a result of the excitation. The negative output pulse is passed through the capacitor 89 and parasitic suppression resistor 91 to the control grid of the discriminator second tube 87. However, the capacitance value of capacitor 89 is quite small so that the time constant of the RC network consisting of resistors 93 and 95 and capacitor 89 is relatively short to cause differentiation of the output pulse from the first discriminator tube 51. This differentiated output pulse, having a steep negative going leading edge followed by an exponential decay-back toward the plate voltage source potential, is fed to the control grid of the second discriminator tube 87. In practice, initial adjustment of the aforementioned RC circuit is made at the lowest signal frequency likely to be encountered. The resistor 95 is adjusted to its position of maximum resistance and then the capacitor 89 is adjusted to provide a differentiated output pulse having a length sufficient to hold the second discriminator tube 87 cut-off for a period of time approximately equal to one quarter of the length of a cycle of the input sine wave, the output pulse from the second discriminator tube 87 then being a positive rectangular pulse of a length determined by the RC time constant. This output pulse is coupled to the control grid of the latch-down tube 103 through the coupling capacitor 105 and the parasitic suppressor resistor 107. The latch-down tube 103, taken with the feed back loop to the grid of tube 87, at this theoretical lowest frequency of operation and at frequencies somewhat higher, acts primarily as a univibrator tube providing negative rectangular output pulses of constant length. However, should the frequency of the input sine wave signal be increased a sufficient amount so that the end of the conducting period of the first discriminator tube 51 would tend to abruptly return the control grid of the second discriminator tube 87 to ground potential before the exponential decay of the RC circuit would return that grid to ground potential then the tube 103 provides an additional "latch-down" function to hold the second discriminator tube 87 cut-off for the length of time determined by the aforementioned RC time constant. Note that the plates of the first discriminator tube 51 and of the latch-down tube 103 are connected together, utilizing a common plate load resistor 79, thereby effectively coupling the output of the latch-down tube 103 back to the RC circuit at the grid of second discriminator tube 87 and forming a triggered multi-vibrator circuit with the first discriminator tube 51 providing the trigger voltage. Thus, when triggered, the latch-down tube 103 will heavily conduct for a length of time determined by the aforementioned RC time constant even though the triggering pulse is of relatively short duration, thereby causing the control grid of the second discriminator tube 87 to be held at cut-off for this period of time. In this manner, once initial adjustments of the circuit have been made at the lowest expected frequency of operation, as hereinbefore described, a negative rectangular pulse of constant length for each input pulse will be produced by tube 103 regardless of the frequency of operation up to approximately 4 times the lowest theoretical frequency. Should still higher frequencies of operation be desired the resistance of adjustable resistor 95 is decreased to decrease the time constant of the RC circuit of which it is a part, the discriminator circuit then operating in exactly the same manner as before but producing output pulses of a shorter duration.

The corresponding RC network in the upper level discriminator 21 is adjusted in the same manner as the aforementioned RC network in the lower level discriminator 19, the time constants being approximately equal so that the negative rectangular output pulse produced by the upper level discriminator 21 will be approximately the same length as that produced by the lower discriminator 19. Since the two output pulses are of the same approximate length the trailing edge of the output pulse from the lower level discriminator 19 will occur during the presence of an output pulse from the upper level discriminator 21 because the operating threshold level of the lower level discriminator 19 is exceeded before that of the upper level discriminator 19 due to the finite rise time of a positive sine wave alternation.

The outputs of the two discriminators are combined in anti-coincidence gate 27 containing a gating tube 131 of a type similar to that of the first discriminator tube 51. The control grid of the gating amplifier tube 131 is negatively biased from the negative bias voltage source 55 through a resistive voltage dividing network consisting of resistors 133 and 135. Grid No. 3 of the gating tube 131 is biased at ground potential by the combination of a resistor 137 connecting the third grid to the positive voltage terminal $E_{bb}$ and a clamping diode 139 connecting the third grid to ground. The clamping diode permits the third grid to swing negative but prevents it from swinging positive, i.e., the diode 139 clamps at ground potential. Operating plate and screen voltages for the tube 131 are obtained from terminals $E_{bb}$ through resistors 141 and 143 respectively, the screen grid being bypassed to ground for A.C. potentials by a bypass capacitor 145. The output of the upper level discriminator 21 is coupled to grid No. 3 of the gating tube 131 through a coupling capacitor 147. In the absence of a signal from the upper level discriminator 21 the third grid of tube 131 is at ground potential, thereby permitting tube conduction upon receipt of a positive signal voltage at the control grid. When a negative rectangular output pulse from the upper level discriminator 21 is impressed upon the second control grid of tube 131 through the coupling capacitor 147 the second control grid potential will drop below ground potential. This negative excursion will cause "vetoing" of the gated amplifier tube 131, so that the impression of a positive signal voltage upon the first control grid will no longer cause tube conduction. Thus, gating tube 131 will conduct and produce an output pulse only upon receipt of an input from the lower level discriminator 19 in the absence of an input from the upper level discriminator 21.

The output of the lower level discriminator 19 (the plate circuit of latch-down tube 103) is coupled to the first control grid of the gate tube 131 through a small coupling capacitor 149 which also serves to differentiate the negative rectangular output pulse into a negative voltage spike caused by the leading edge of the output pulse and a sharp positive spike caused by the trailing edge of the output pulse. Since the control grid of the gating tube 131 is negatively biased to cut-off the negative spike has no effect upon the gating tube. However, the positive spike, caused by the trailing edge of the lower level discriminator output pulse, will drive the gating tube into conduction in the absence of a negative signal applied to its second grid from upper level discriminator 21.

The output pulse produced by gating tube 131 is a sharp negative spike derived from the trailing edge of the negative rectangular output pulse from the lower level discriminator 19. The output spikes from gating tube 131 are coupled through a coupling capacitor 153 to the scaler 31 shown in block form, the scaler thereby effectively counting the number of cycles of a sinusoid as it decays between the predetermined upper and lower operating threshold limits of amplitude discriminators 19 and 21 respectively.

The scaler 31 can be any fast scaler device known to the art. By proper design of the discriminator and gate circuitry the frequency response of the apparatus will be limited only by the counting speed of the scaler.

Although the invention has been described with a certain degree of particularity, it is understood that the present disclosure has been made only by way of example and that numerous changes in the details of the construction and in the combination and arrangement of parts may be resorted to without departing from the spirit and the scope of the invention as hereinafter claimed.

What is claimed is:

1. Apparatus for measuring the Q of a resonant device from which device, for a particular mode of oscillation, sinusoidal electrical output pulses proportional to the amplitude of the oscillations can be obtained, comprising means for deriving and amplifying the sinusoidal electrical output pulses from said resonant device, upper level amplitude discriminator means excited by the output pulses from said deriving and amplifying means, said upper level discriminator means being adapted to produce an electrical output pulse of a predetermined duration less than the duration of the excitation pulse each time the excitation exceeds a predetermined operating threshold level, lower level amplitude discriminator means excited by the output pulses from said deriving and amplifying means, said lower level discriminator means being adapted to produce an electrical output pulse of a predetermined duration less than the duration of the excitation pulse each time the excitation exceeds a predetermined operating threshold level below the operating threshold level of said upper level discriminator means, electronic gating means responsive to the electrical output pulses from said upper level and lower level amplitude discriminator means, said electronic gating means being adapted to produce an electrical output pulse only upon receiving an output pulse from said lower level discriminator in the absence of an output pulse from said upper level discriminator, and means adapted to count the output pulses from said electronic gating means, whereby when a series of logarithmically decaying electrical output pulses is derived by said apparatus from said resonant device there is obtained a count of the number of pulses occurring while the pulse amplitude at the output of said deriving and amplifying means decays between the limits determined by the operating threshold levels of said upper level and lower level amplitude discriminator means, thereby affording a measure of the Q of said resonant system.

2. The apparatus of claim 1 wherein the operating threshold level of said upper level discriminator means is adjustable and the operating threshold level of said lower level discriminator means is maintainable in a predetermined constant relationship with the operating threshold level of said upper level discriminator means.

3. The apparatus of claim 1 wherein the operating threshold level of said upper level discriminator means is adjustable and the operating threshold level of said lower level discriminator means is maintained at $1/e$ times the operating threshold level of said upper level discriminator means.

4. The apparatus of claim 1 wherein the operating threshold level of said upper level discriminator means is adjustable and the operating threshold level of said lower level discriminator means is maintained at $1/4.8$ times the operating threshold level of said upper level discriminator means.

5. Apparatus for measuring the Q of a resonant device from which device, for a particular mode of oscillation, sinusoidal electrical output pulses proportional to the amplitude of the oscillations can be obtained, comprising means for deriving and amplifying the sinusoidal electrical output pulses from said resonant device, upper level amplitude discriminator means excited by the output pulses from said deriving and amplifying means, said upper level discriminator means being adapted to produce an electrical output pulse of a predetermined duration less than the duration of the excitation pulse each time the excitation exceeds a predetermined operating threshold level, lower level amplitude discriminator means excited by the output pulses from said deriving and amplifying means, said lower level discriminator means being adapted to produce an electrical output pulse of a predetermined duration less than the duration of the excitation pulse each time the excitation exceeds a predetermined operating threshold level below the operating threshold level of said upper level discriminator means, electronic gating means responsive to negative electrical output pulses from said upper level discriminator means and to the trailing edge of negative electrical output pulses from said lower level discriminator means, said electronic gating means being adapted to produce an electrical output pulse only upon receiving an output pulse from said lower level discriminator means in the absence of an output pulse from said upper level discriminator means, and means adapted to count the output pulses from said electronic gating means, whereby when a series of logarithmically decaying electrical output pulses is derived by said apparatus from said resonant device there is obtained a count of the number of pulses occurring while the pulse amplitude at the output of said deriving and amplifying means decays between the limits determined by the operating threshold levels of said upper level and lower level amplitude discriminator means, thereby affording a measure of the Q of said resonant system.

References Cited in the file of this patent

UNITED STATES PATENTS

| | | |
|---|---|---|
| 2,654,066 | Rosenbaum | Sept. 29, 1953 |
| 2,701,337 | Morrow | Feb. 1, 1955 |
| 2,929,988 | Engleman | Mar. 22, 1960 |

OTHER REFERENCES

Article, National Bureau of Standards, Technical News Bulletin, volume 36, issue 12, pages 186–188, Dec. 1952. (Copy in 73–67.2.)